United States Patent
Rohan

(10) Patent No.: US 6,375,470 B1
(45) Date of Patent: Apr. 23, 2002

(54) METHOD FOR FACILITATING ALLIANCE BUILDING

(76) Inventor: Dennis Rohan, 2527 Blackthorn St., Newport Beach, CA (US) 92660

( * ) Notice: Subject to any disclaimer, the term of this patent is extended or adjusted under 35 U.S.C. 154(b) by 0 days.

(21) Appl. No.: 09/436,536

(22) Filed: Nov. 9, 1999

(51) Int. Cl.$^7$ .............................................. G09B 19/00
(52) U.S. Cl. ...................................... 434/236; 434/219
(58) Field of Search ................................. 434/107, 219, 434/235, 236, 237, 238

(56) References Cited

U.S. PATENT DOCUMENTS

| | | | |
|---|---|---|---|
| 4,440,396 A | 4/1984 | Frudakis | 273/242 |
| 5,725,381 A | 3/1998 | Kollath et al. | 434/238 |
| 5,931,469 A | 8/1999 | Stichnoth | 273/242 |

OTHER PUBLICATIONS

Childers, Tom R., "Short Essay on the Biological Roots of Meditative Inquiry", 1998, http://users.erols.com/childers/mgl/bioroots.html.*

Payne, John, "Creative Words—Reality creating made easy", Jan. 3, 1998, http://www.spiritweb.org/Spirit/creative–words–omni.html.*

"Tony Dottino helps managers and employees harness the brain's power to nurture creativity" Nov. 8, 1999, Business News.*

* cited by examiner

*Primary Examiner*—John Edmund Rovnak
(74) *Attorney, Agent, or Firm*—The Halvorson Law Firm

(57) ABSTRACT

The present invention is a method for training individuals in the work place that utilizes a specific process to facilitate work place alliance-building by focusing on interpersonal skills and abilities found in instinctive behavior patterns, the mature brain, rather than cognitive behavior patterns, the new brain. This method is titled Thought Process Development System. The method according to the present invention relies upon the psychological and/or sociological theories of evolutionary psychology. Specifically, the present invention is built upon the theories that the human brain embodies both an old, early evolved brain, termed the "mature brain" and a more recently evolved brain, termed the "new brain". The mature brain more easily handles behavioral tasks such as motivation, people skills, innovation, memory, and seeing situations in total (seeing the "big picture"); the new brain more easily handles problems such as logic, objectivity, precision, analysis, and technology. Current theories of evolutionary psychology and neuroscience state that because certain skills and abilities were necessary for the survival of early man, the mature brain became highly skilled in those areas. Similarly, as man evolved, more recently developed higher cognitive functions of the brain became very highly skilled in new areas that were necessary for a more complex society. Because success in the modern work place requires the use of both sets of skills, successful individuals must, necessarily use both the mature brain and the new brain in their day to day lives.

10 Claims, 5 Drawing Sheets

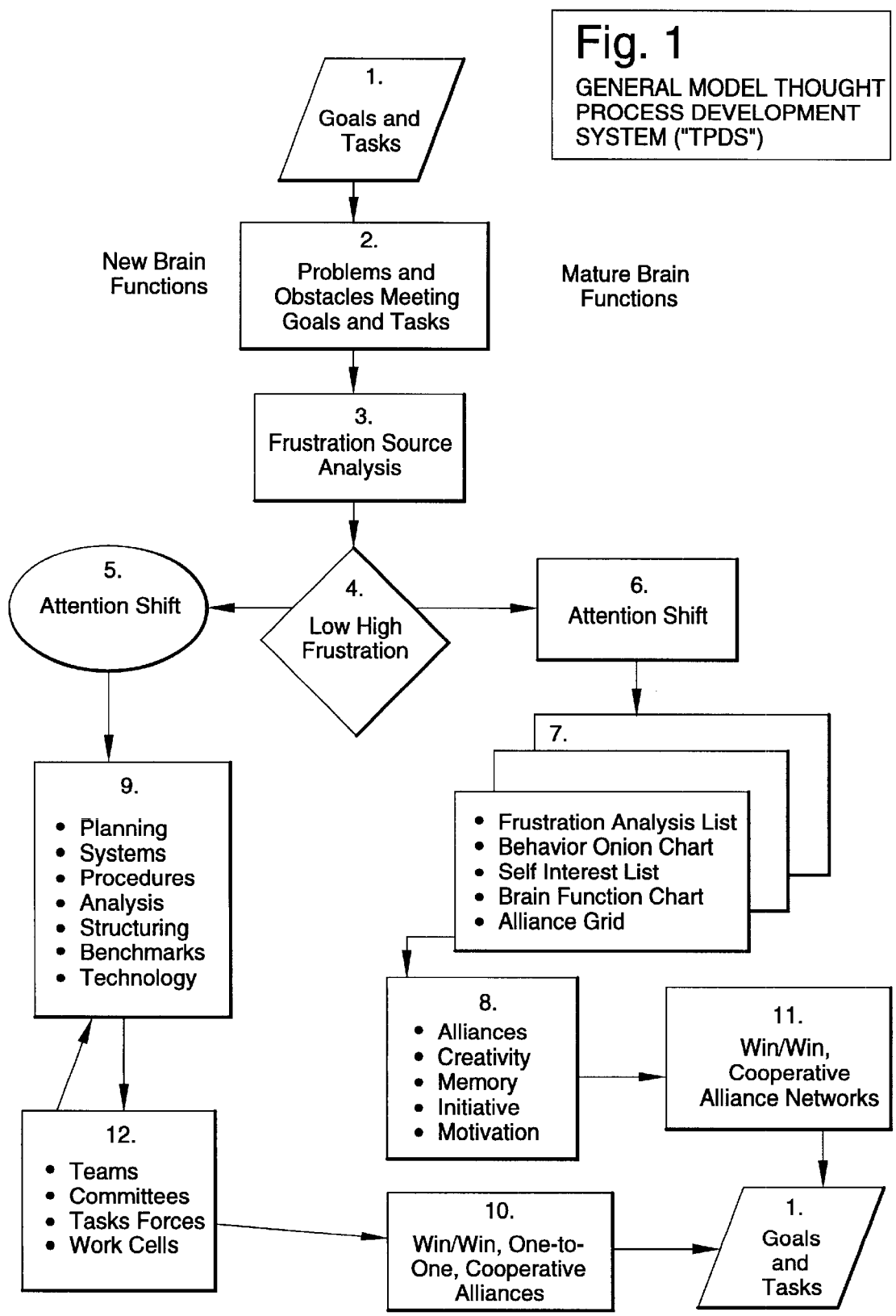

THE DUAL BRAIN PARADIGM MODEL

High +
Dominance
Planning
Controlling
Orchestrating
Analyzing
Directing

Low -
Influence

Low -
Influence
React
Execute
Cooperate
Motivate
Results

High +
Dominance

BEHAVIOR FACTORS

1. Attitudes
2. Styles
3. Values/Culture
4. Temperament
5. Brain Functions

BRAIN DEVELOPMENT PROFILE (in years)

130 k        1m        5m        7m        500m

Fig. 6
WHOLE BRAIN

NEW BRAIN     MATURE BRAIN

| NEW BRAIN | MATURE BRAIN |
|---|---|
| 1. LOGIC | 1. MOTIVATION |
| 2. OBJECTIVE | 2. PEOPLE SKILLS |
| 3. PRECISION | 3. INNOVATION |
| 4. ANALYSIS | 4. MEMORY |
| 5. TECHNOLOGY | 5. BIG PICTURE |

⇩         ⇩

| REGULAR TEAMS | ALLIANCE NETWORKS |
|---|---|
| DEPARTMENT MEETINGS | FRIENDSHIP BONDS |
| COMMITTEE/TASK FORCES | COLLABORATION |
| WORK CELLS, TQM, ISO | ALLIANCES BONDS |

Fig. 7
NEW BRAIN AND MATURE BRAIN WORDS

| NEW BRAIN | | MATURE BRAIN |
|---:|:---:|:---|
| TASK/GOAL | ⟺ | PROBLEM |
| ROLE | ⟺ | ACTION |
| COMPLETE/ACCOMPLISH | ⟺ | PULL OFF |
| CHALLENGE | ⟺ | CRISIS |
| BRAINSTORM | ⟺ | GET IDEAS |
| EXPERIMENT | ⟺ | TRY OUT |
| STRESS | ⟺ | FRUSTRATION |

NEUTRAL BRIDGE WORDS
SITUATION
ISSUE
CONCERN

METHOD FOR FACILITATING ALLIANCE BUILDING

FIELD OF THE INVENTION

The present invention relates to the field of a method for training and motivating management employees and workers to improve work place efficiency and team building by training said management employees and workers in a specific psychological method and motivational method that facilitates cooperation and building of interpersonal alliances by using skills from the more early evolved portion of the human brain. Generally, the present invention relates to a process utilizing theories of evolutionary psychology that promotes alliance building between individuals by training those individuals to utilize areas of the brain that are more evolutionarily primitive. More specifically, individuals are trained to identify and focus on skills that arise from the more primitive parts of the human brain to facilitate alliance building both within the work environment, as with peers, managers and subordinates, and external to the work environment, as with customers and suppliers, to increase work place productivity.

BACKGROUND OF THE INVENTION

The use of various types of motivational devices and methods are known in the prior art. Motivational training or systems that employs psychological methods generally involves discussion of the psychological and sociological theories that underlie the method and specific training and incorporate these discussions in the precise steps necessary to employ the method itself. These motivational systems employ various specific steps to cause a desired change in an individual's behavior toward the specific goal of the motivational system in question.

While there is a body of literature that generally relates to the present invention, none of the prior art specifically teaches or describes the method according to the present application. By way of example, U.S. Pat. No. 5,725,381 describes a motivation system for children which utilizes a reward system coupled with a motivational system board game designed to modify children's behavior to achieve certain, identified goals. The motivation system board game is divided into sections to display for the child the desired behavior, the reward, in terms of tokens, to be earned for the desired behavior and the prizes that can be "bought" for tokens earned. This invention is designed to be flexible enough to be used to achieve a variety of changes in a child's behavior, and, thereby, designed to be used in a wide variety of settings. This invention describes theories of reinforcement as a tool for behavior modification when used in conjunction with the motivation system board to effect the desired change in a child's behavior.

U.S. Pat. No. 4,440,396 describes the use of a board game to provide the motivational system for individuals to alter specific target behaviors, the described behaviors being related to diet and weight loss and/or weight control. The invention consists of a board game designed to be mounted on the player's refrigerator. The game progresses over time during the player's entire weight loss period and provides reinforcement and motivation that varies as the player moves toward the ultimate weight loss goal. The invention discusses the background theory of positive reinforcement and the other psychological theories that must be considered in a weight loss regimen. The patent also describes how the invention could be modified by a person skilled in the art to provide a behavior modification for other areas where nervous energy and frustration are involved, such as smoking cessation.

U.S. Pat. No. 5,931,469 describes the use of a board game by therapists to train and motivate individuals, particularly juveniles, persons with attention deficit disorder and/or persons having a low level of intellectual functioning, to make positive life choices for the problems in their lives. The motivational system is designed to be played by multiple players. The players move around the designed game board along roadways that depict life choices and problems as well as positive and negative coping methods. At certain points along the game path, the player must identify positive and/or negative coping methods and choices. Such positive and negative coping methods and choices are designed to train the player to make choices in his or her life that tend to result in positive outcomes rather than negative outcomes. Again, as with the patent described above, one ordinarily skilled in the art would be able to make minor modifications in the invention to meet the needs of other populations or specific behavior modification needs for target individuals. This invention also discusses the psychological theory behind behavior modification and the success of behavior modification in dealing with certain target populations.

While the prior art dealing with training and motivational methods to alter an individual's behavior choices are useful for their intended purposes, the prior art involving motivation systems deals behavior modification of specific life choices among a target population. The prior art does not address the psychological and/or sociological theories of evolutionary psychology and evolutionary neuroscience that underlie the present patent application. Similarly, the training and motivation method described in the present invention are completely different from descriptions found in prior art.

SUMMARY OF THE INVENTION

It is an object of the present invention to provide a method, the Thought Process Development System, for training individuals in the steps of a specific process designed to promote the use of more early evolving, popularly mislabeled as primitive, portions of the human brain, termed the "mature brain," to facilitate alliance building within the work place. The method teaches individuals which interpersonal skills and tasks arise from the mature brain and which interpersonal skills and tasks arise from the more recently evolved portion of the brain, termed the "new brain." The method then teaches individuals how to use these separate areas of the brain most efficiently to build stronger, more effective alliances within the work place.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 1 is a flow chart describing the separation in functions between the mature brain functions and the new brain functions as relates to interpersonal interactions.

FIG. 6 is a chart describing the five main skills and behaviors controlled by the new brain and the mature brain, respectively, and relating these skills and behaviors to necessary interpersonal relationships, innovation, planning, communications and perspective modification within the work place.

FIG. 7 is a chart of different words that trigger the mature brain and the new brain.

DESCRIPTION OF THE PREFERRED EMBODIMENTS

The present invention is a method for training individuals in the work place that utilizes a specific process to facilitate work place alliance-building by focusing on interpersonal skills and abilities found in instinctive behavior patterns, the mature brain, rather than cognitive behavior patterns, the new brain. This method is titled Thought Process Development System.

The method according to the present invention relies upon the psychological and/or sociological theories of evolutionary psychology. Specifically, the present invention is built upon the theories that the human brain embodies both an old, primitive brain, termed the "mature brain" and a more recently evolved brain, termed the "modem brain". The mature brain more easily handles behavioral tasks such as motivation, people skills, innovation, memory, and seeing situations in total (seeing the "big picture"), the new brain more easily handles problems such as logic, objectivity, precision, analysis, and technology. Current theories of evolutionary psychology and neuroscience state that because certain skills and abilities were necessary for the survival of early man, the mature brain became highly skilled in those areas. Similarly, as man evolved, more recently developed higher cognitive functions of the brain developed as man became very highly skilled in complex cognitive areas that were necessary for a more complex society. Because success in the modern work place requires the use of both sets of skills, successful individuals must, necessarily use both the mature brain and the new brain in their day to day lives.

Figure 4:
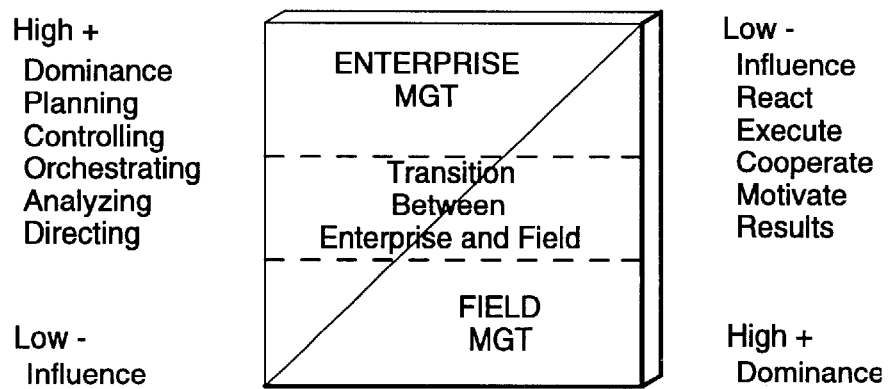
FIG. 4 is a chart describing the different work place behavioral characteristics of the mature brain and the new brain as described in the dual brain paradigm model.
Figure 3:
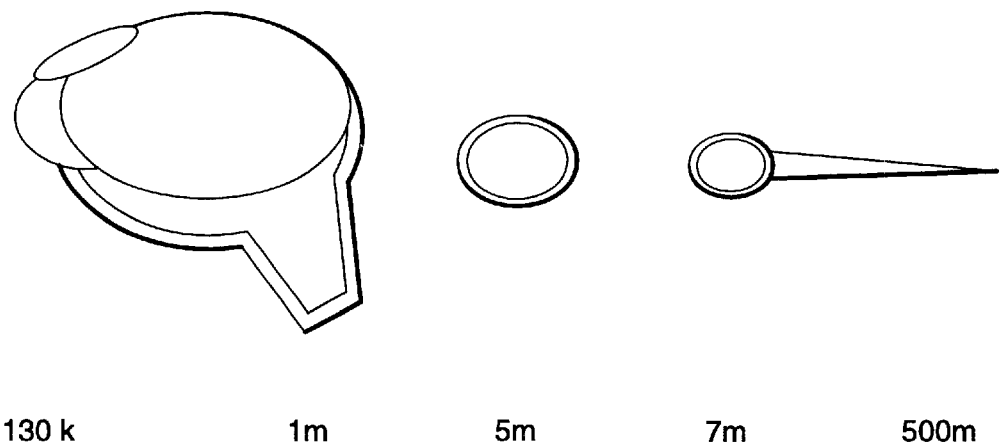
FIG. 3 is a drawing describing the evolutionary development of the human brain.

In theory, the mature brain developed approximately two to five million years ago and controls functions of behavior specializing in interpersonal relationships, motivation, and collaboration; quick responses to problems, and different views to problems. The new brain, however developed approximately 50,000 to 150,000 years ago and controls functions of behavior such as objectivity, precision, and logic, analysis, and technology. The cognitive processes for each individual include both mature brain functions and new brain functions and incorporates skills and weaknesses from both the mature brain and the new brain. This is illustrated in FIG. 3 and FIG. 4.

Figure 2:
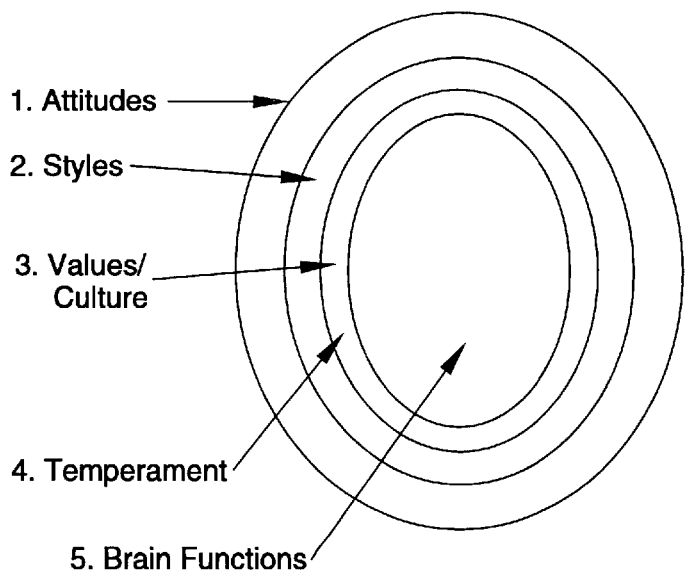
FIG. 2 is a drawing describing the layers of factors that influence an individual's behavior and interpersonal dynamics.

Human behavior can be influenced by a series of factors: learned factors, such as attitude, style, values or culture; and biologically innate factors, such as temperament and brain function. This is illustrated in FIG. 2. According to the present invention the Thought Process Development System involves the differences between two evolutionary human thought structures: the mature brain and the new brain. The Thought Process Development System identifies and segregates the tasks of the mature brain and the new brain functions to be utilized for training individuals to use appropriate mature brain and new brain functions for a specific task and to facilitate alliance building in the work place.

The specific training and method of the present invention teaches individuals, such as work place managers and employees, to specifically utilize the skills of the mature brain to facilitate positive interpersonal relationships and alliance building. Innovation and motivation skills specific to the mature brain are absolutely necessary for success in the work place and these skills focus on different work place relationships than the currently popular systems of teams, team meetings, and manager-worker relations.

In a preferred embodiment, individuals attend at least one training seminar during which they participate in a series of individual coaching sessions on applying the Thought Process Development System. Further, the individuals obtain independent training materials that reinforce the individuals in the differences between the mature brain and the new brain.

The method according to the present invention utilizes a specific process that facilitates work place alliance building by focusing on and emphasizing interpersonal skills and abilities found in the mature brain rather than the new brain. The process comprises the steps of: instructing the individuals in the theories of evolutionary psychology and evolutionary neuroscience as such theories describe the behavioral characteristics and functions of the early developed "mature brain"; instructing the individuals in the theories of evolutionary psychology and evolutionary neuroscience as such theories describe the behavior characteristics and functions of the more recently evolved "new brain"; comparing the "mature brain" to the "new brain"; instructing said individuals in the particular skills and strengths of the mature brain versus the new brain; instructing said individuals in the particular weaknesses of the mature brain versus the new brain; instructing said individuals in how the differences, strengths and weaknesses between the mature brain and the new brain related to work place interpersonal relationships; enabling said individuals to build alliances and work place relationships through an increased emphasis of mature brain characteristics, enabling the individuals to increase work place productivity, creativity and problem solving in the work place using the differences, strengths, and weaknesses between the mature brain and the new brain. This is illustrated in FIG. 1.

According to the method of the present invention, individuals are instructed in the particular skills and strengths of the mature brain versus the new brain. Nearly simultaneously, the individuals are instructed in the particular weaknesses of the mature brain versus the new brain. The individuals are instructed as to how these differences, strengths, and weaknesses relate to work place interpersonal relationships. Finally, the individuals are taught how to use skills from the mature brain to build alliances and positive work place relationships, how to increase work place productivity, and how to problem-solve in the work place using the differences, strengths, and weaknesses between the mature brain and the new brain.

The individuals are taught that the mature brain has specific skills and strengths: the ability to process many hundreds of ideas simultaneously; the ability to cooperate and build alliances with others; the ability to interact with others; the ability to motivate the individual; the ability to store ideas in memory; the ability to put ideas, items and situations in perspective; the ability to be innovative and creative; the ability to detect whether another individual is telling the truth; the ability to oversee and direct bodily functions; and the ability to feel emotions.

Figure 5:
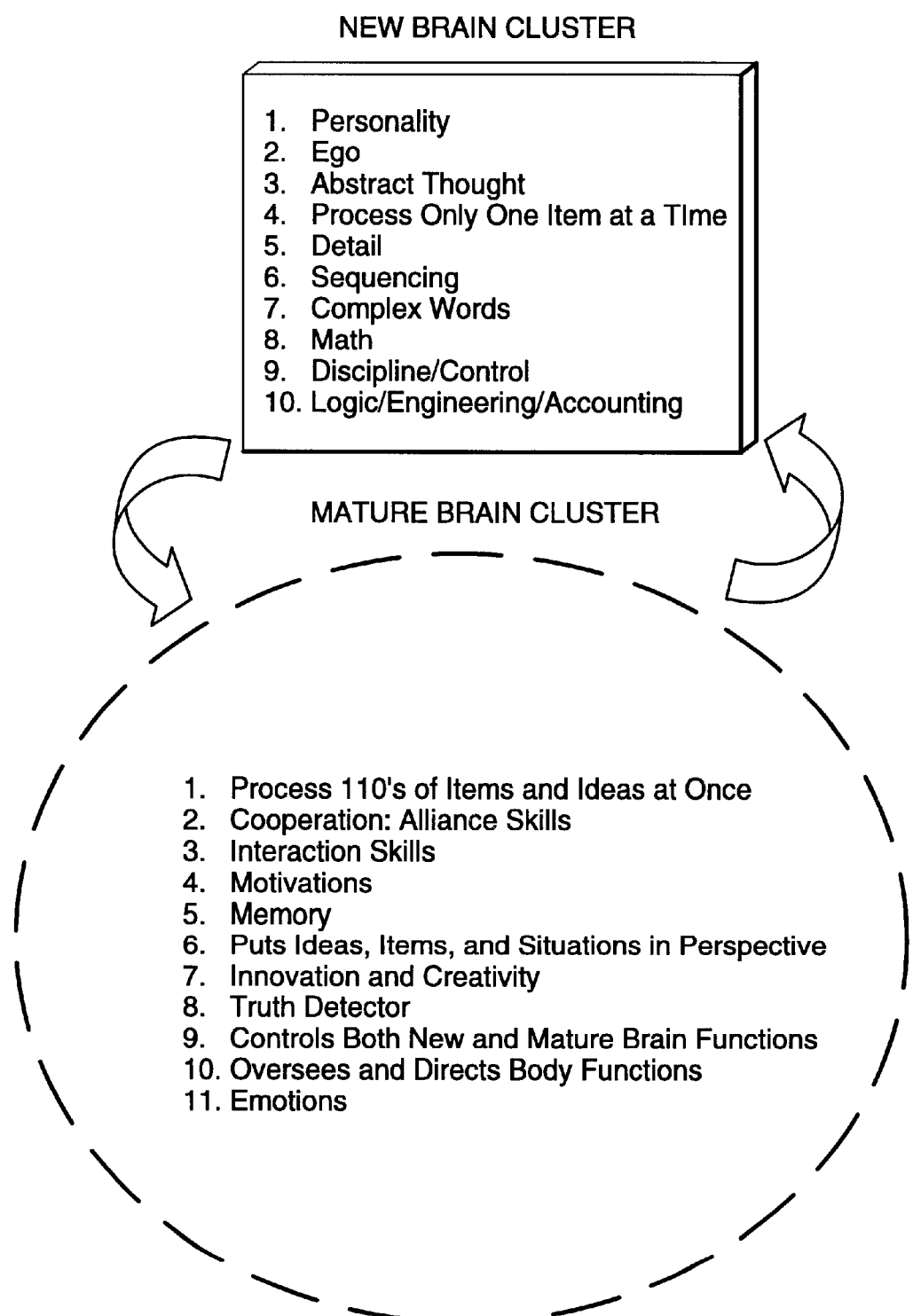
FIG. 5 is a drawing describing the different skills and behaviors controlled by the new brain and the mature brain, respectively.

The individuals are taught that the skills and strengths of the new brain, on the other hand, are: the ability to control personality; the ability to control one's ego; the ability to engage in abstract thought; the ability to process one item at a time; the ability to focus on detail; the ability to use complex language and words; the ability to provide discipline and control to the individual; the ability to think in terms of mathematics, logic, and sequencing; and the ability to excel in technical areas requiring these skills. This is illustrated in FIG. 5.

The individuals are taught that the particular weaknesses of the mature brain are the inability to handle detail or precision effectively; the inability to remain objective; and the inability to stay focused on one task. Additionally, the mature brain is irrational, emotional, and subjective; it is undisciplined and is easily distractible; it is arrogant; it typically utilizes fragmented ideas, feelings, and messages that would be ambiguous to the new brain; and it is unable to discern the difference between fact and fiction.

The individuals are taught that the particular weaknesses of the new brain are: the inability to deal with emotional problems, people problems, and interpersonal relations; the inability to deal with interruptions and problems needing quick solutions and crisis management; the inability to deal with ambiguous situations, unexpected situations, and change; the inability to see the same issue from different perspectives; and the inability to effectively use memory and think innovatively or creatively.

The individuals are taught that the new brain can be thought of as immature, with many abilities not fully developed and thinking activities not automatic. The new brain is rigid and shortsighted and is uncomfortable with unplanned changes, ambiguity, and interpersonal relationships, which are inherently ambiguous and subject to instant and unpredictable changes. The new brain uses short-term memory and frequently requires reminders, such as written records and rote memorization.

There are certain group behavioral fundamentals: people are primarily individuals and group participants when needed; people in groups are more inclined to act like banded or pack animals, not herd animals; the mature brain governs most of our day-to-day group behavior and problem solving activities; and the new brains structured methods fail to gain or hold the mature brain's attention for long periods of time.

It has been found that alliances in the work place put the teamwork back into teams; that alliance-based teamwork thrives with or without regular team efforts; that human nature through evolutionary psychology can be made to work for the work place manager, not against the manager; and that alliances provide the level of motivation everyone deserves.

The new brain has highly limited motivational and alliance building abilities. The new brain functions more efficiently on the structured level of building regular teams such as department meetings, committee meetings, task forces, and work cells. Regular teams, without alliance bonds built upon mature brain concepts and strengths, lack durability, initiative and responsiveness; lack creativity, motivation and flexibility; and lack day-to-day problem solving ability, individual commitment and adaptability to change. These regular teams and work groups rely on structure including formal roles, job descriptions, and agendas; and utilize facilitators, empowerment, participation, visual aids, social functions and retreats to develop team building. Thus, the new brain work groups and regular teams are effective for assigning structure and accountability to work units, assigning performance goals and measurement systems to work groups, and introducing major changes that require strategic planning and overall direction. Additionally, these new brain regular teams and work groups have team members that typically exhibit traits that negatively impact creative productivity such as responding poorly to criticism, attacking one another, reluctance to speak openly, appear disinterested, act defensively, require strict rules of behavior, revert to old behaviors in the absence of a trained group leader or facilitator.

The mature brain recognizes certain command words for creative action while the new brain recognizes different command words for structured action. The mature brain functions more efficiently than the new brain on the creative level of building alliance networks comprising friendship bonds, collaboration and alliance bonds. The mature brain recognizes words such as problem, action, pull off, crisis, get ideas, try out, and frustration while the new brain recognizes words such as goal/task, role, complete/accomplish, challenge, brain storm, experiment and stress. Further examples of these different words are illustrated in FIG. 7. The mature brain does not readily respond to new brain team building words or methods and the new brain does not respond to mature brain motivation and people relations, team building words or methods. However, there are also certain neutral bridge words that can be used to move from new brain tasks to mature brain tasks, such words include situation, issue, and concern.

Because the new brain and the mature brain do not share the same language and do not automatically communicate with each other, regular work place teams built around new brain concepts and strengths cannot take advantage of the problem solving skills of the mature brain. Preferably, however, the various strengths and weaknesses of the mature brain and the new brain can be utilized together to facilitate alliance-building and positive interpersonal relationships within the work place.

In the method according to the present invention, the individuals are instructed to convert concepts, words and ideas from terms recognizable by the new brain to terms recognizable by the mature brain, i.e.: convert the term "task" to the term "problem" in order to stimulate the mature brain to trigger motivation and develop alliances to respond to the problem at hand. This conversion of concepts, words and ideas from new brain terms to mature brain terms can be used by work place managers to directly motivate employees to utilize mature brain functions for improved interpersonal relationships and alliance building, even when the employees have not been specifically trained in the Thought Process Development System.

In the method according to the present invention, the individuals are instructed in the specific skills and strengths of the mature brain versus the new brain, i.e.: the mature brain controls people relations and motivation, alliances and collaboration, innovation, quick responses to problems, change and ambiguous situations, memory, the ability to consider and manage multiple tasks at one time and the ability to view problems from different perspectives and determine how different aspects of a problem fit together; and the new brain controls logic, objectivity, precision, analysis, technology, and the ability to think in terms of: numbers and formulas, specific words and procedures, an orderly and focused sequence of events, technology and analysis and detailed plans. This is illustrated in FIG. 5.

In the method according to the present invention, the individuals are instructed in the specific weaknesses of the mature brain versus the new brain, i.e.: the mature brain is irrational and tends to be emotional and subjective, is undisciplined and is easily distractible, confuses fact with fiction, and is arrogant and sends fragmented ideas, feelings and ambiguous messages to the new brain; and the new brain has a short memory requiring reminders, written records and rote memorization, is immature with many abilities not fully developed, has thinking skills that are not automatic but require significant conscious effort, does not readily communicate information with the mature brain, is rigid and short-sighted, is uncomfortable with unexpected changes, is uncomfortable with ambiguity, is uncomfortable with interpersonal relationships, has very limited ability for motivation.

The individuals are then instructed as to how the strengths and weaknesses of the mature brain and the new brain relate to the modem work place: the mature brain functions on the work place level of building alliance networks comprising friendship bonds, collaboration and alliance bonds; and the new brain functions on the work place level of building regular structured teams such as department meetings, committee meetings, task forces, and work cells. This is illustrated in FIG. 6.

The individuals are instructed as to the differences between building alliances using the mature brain and building regular teams using the new brain by explaining that regular teams and new brain work groups are effective for assigning structure and accountability to work units, assigning performance goals and measurement systems to work groups, and introducing major changes that require strategic planning and overall direction; rely on structure including formal roles, job descriptions and agendas; utilize facilitators, empowerment, participation, visual aids, social functions and retreats to develop team building; and have team members that exhibit traits that negatively impact productivity such as responding poorly to criticism, attacking one another, reluctance to speak openly, appear disinterested, act defensively, require strict rules of behavior, revert to old behaviors in the absence of a trained group leader or facilitator.

The individuals are taught to use statements that can be perceived by the mature brain into action in order to trigger the interpersonal relationship building and alliance building functions of the mature brain for improved problem solving and improved efficiency in the modem work place. The individuals are taught to employ specific planning tools to encourage use of mature brain skills and abilities in the modem work place for improved problem solving and improved efficiency. This is illustrated in FIG. 8, and FIG. 9.

The net result of the method according to the present invention is a shift if an individual's thinking. This shift is from structured agenda oriented concepts and terms to problems solving and group cooperative oriented concepts and terms. Thus, the individual is virtually "forced" to take advantage of mature brain skills and strengths when building team alliances and solving work place problems.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for facilitating alliance building by an individual comprising the steps of:

A. teaching an individual at least one mature brain evolutionary psychology concept selected from the group consisting of motivation, people skills, innovation, memory, and seeing situations in total;

B. teaching the individual at least one new brain evolutionary psychology concept selected from the group consisting of logic, objectivity, precision, analysis, and technology;

C. teaching the individual behavioral strengths of the mature brain, such as alliance building and problem solving;

D. teaching the individual behavioral strengths of the new brain, such as structured team building and agendazation;

E. teaching the individual at least one behavioral weakness of the mature brain selected from the group consisting of the inability to handle details or precision effectively; the inability to remain objective; the inability to stay focused on one task; irrationality; emotionality; subjectivity; undisciplined; easily distractible;

arrogance; the utilization of fragmented ideas, feelings, and messages; and the inability to discern the difference between fact and fiction;

F. teaching the individual at least one behavioral weakness of the new brain selected from the group consisting of the inability to deal with emotional problems, people problems, and interpersonal relations; the inability to deal with interruptions and problems needing quick solutions and crisis management; the inability to deal with ambiguous situations, unexpected situations, and change; the inability to see the same issue from different perspectives; and the inability to effectively access large blocks of memory and think innovatively or creatively;

G. teaching the individual words, terms, and concepts accessible by the mature brain and that, when used, result in an increase in the alliance building and problems solving action by the mature brain;

H. teaching the individual words, terms, and concepts accessible by the new brain; and that, when used, result in an increase in the structured team building and agendazation action by the new brain;

I. teaching the individual to convert words accessible by the mature brain in place of words accessible by the new brain in order to increase participation of the mature brain in alliance building.

2. The method according to claim 1 further including the step of using the said words that are accessible by the mature brain in place of words that are accessible by the new brain on other individuals in order to increase the other individual's mature brain participation in alliance building.

3. The method according to claim 1 where in the step of teaching the individual new brain evolutionary psychology concepts occurs before the step of teaching an individual mature brain evolutionary psychology concepts.

4. The method according to claim 2 where in the step of teaching the individual new brain evolutionary psychology concepts occurs before the step of teaching an individual mature brain evolutionary psychology concepts.

5. The method according to claim 1 where in the step of teaching the individual behavioral strengths of the new brain, such as structured team building and agendazation, occurs before the step of teaching the individual behavioral strengths of the mature brain, such as alliance building and problem solving.

6. The method according to claim 2 where in the step of teaching the individual behavioral strengths of the new brain, such as structured team building and agendazation occurs before the step of teaching the individual behavioral strengths of the mature brain, such as alliance building and problem solving.

7. The method according to claim 1 where in the step of teaching the individual behavioral weaknesses of the new brain occurs before the step of teaching the individual behavioral weaknesses of the mature brain.

8. The method according to claim 2 where in the step of teaching the individual behavioral weaknesses of the new brain occurs before the step of teaching the individual behavioral weaknesses of the mature brain.

9. The method according to claim 1 where in the step of teaching the individual words, terms, and concepts accessible by the new brain; and that, when used, results in an increase in the structured team building and agendazation action by the new brain occurs before the step of teaching the individual words, terms, and concepts accessible by the mature brain and that, when used, result in an increase in the alliance building and problems solving action by the mature brain.

10. A method for facilitating alliance building by an individual comprising the steps of:

A. teaching the individual at least one new brain evolutionary psychology concept selected from the group consisting of logic, objectivity, precision, analysis, and technology;

B. teaching the individual at least one mature brain evolutionary psychology concept selected from the group consisting of motivation, people skills, innovation, memory, and seeing situations in total;

C. teaching the individual behavioral strengths of the new brain, such as structured team building and agendazation;

D. teaching the individual behavioral strengths of the mature brain, such as alliance building and problem solving;

E. teaching the individual at least one behavioral weakness of the new brain selected from the group consisting of the inability to deal with emotional problems, people problems, and interpersonal relations; the inability to deal with interruptions and problems needing quick solutions and crisis management; the inability to deal with ambiguous situations, unexpected situations, and change; the inability to see the same issue from different perspectives; and the inability to effectively access large blocks of memory and think innovatively or creatively;

F. teaching the individual at least one behavioral weakness of the mature brain selected from the group consisting of the inability to handle details or precision effectively; the inability to remain objective; the inability to stay focused on one task; irrationality; emotionality; subjectivity; undisciplined; easily distractible; arrogance; the utilization of fragmented ideas, feelings, and messages; and the inability to discern the difference between fact and fiction;

G. teaching the individual words, terms, and concepts accessible by the new brain; and that, when used, result in an increase in the structured team building and agendazation action by the new brain;

H. teaching the individual words, terms, and concepts accessible by the mature brain and that, when used, result in an increase in the alliance building and problems solving action by the mature brain;

I. teaching the individual to convert words accessible by the mature brain in place of words accessible by the new brain in order to increase participation of the mature brain in alliance building.

* * * * *